H. C. NEVILLE.
CLUTCH.
APPLICATION FILED JULY 26, 1918.
1,316,590.
Patented Sept. 23, 1919.
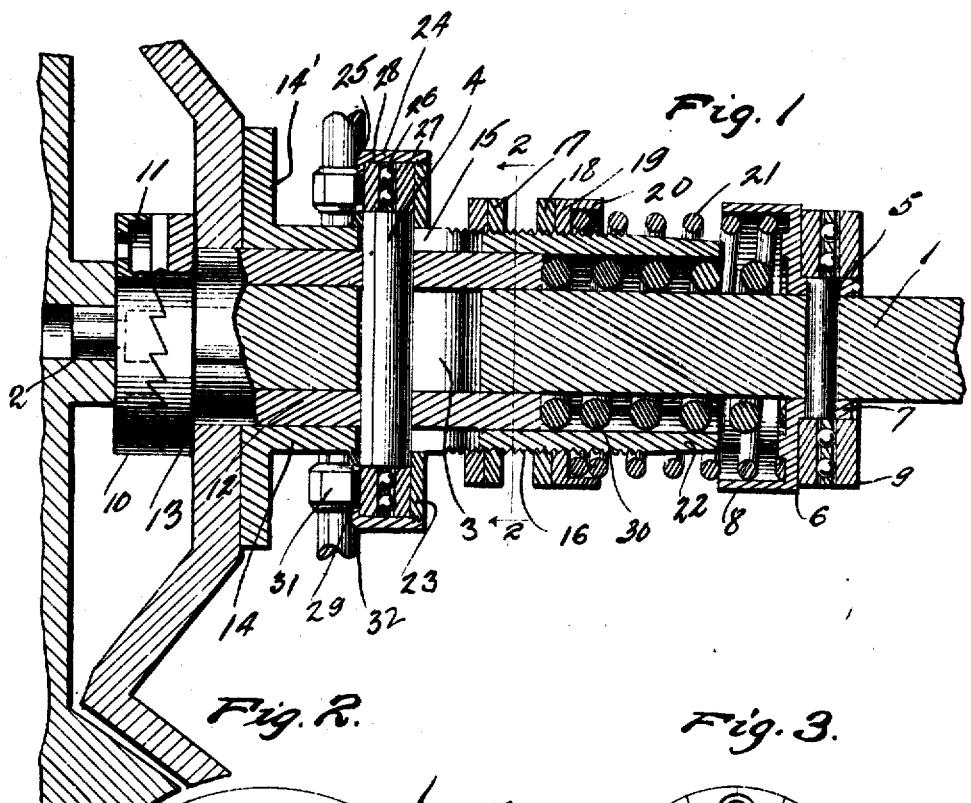
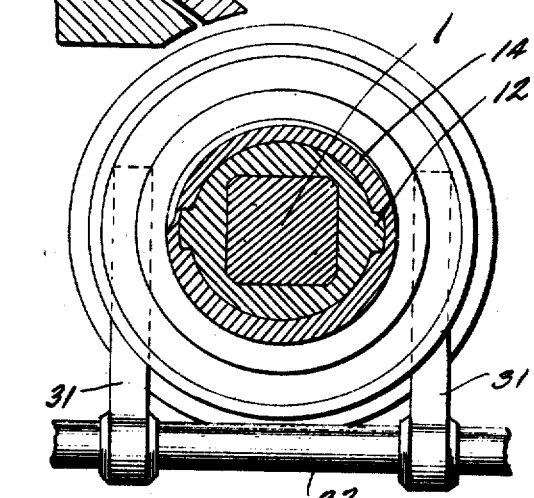
Witnesses
Geo Walling
S M McColl
Inventor
Herbert C. Neville
By Richard Oliver,
Attorney

UNITED STATES PATENT OFFICE.

HERBERT C. NEVILLE, OF EAST MOLINE, ILLINOIS.

CLUTCH.

1,316,590.   Specification of Letters Patent.   Patented Sept. 23, 1919.

Application filed July 26, 1918. Serial No. 264,924.

*To all whom it may concern:*

Be it known that I, HERBERT C. NEVILLE, a citizen of the United States, residing at East Moline, in the county of Rock Island and State of Illinois, have invented certain new and useful Improvements in Clutches, of which the following is a specification.

This invention relates to clutches, and the primary object thereof is to provide a clutch which will not slip.

Another object is to so construct a clutch of this character in which a friction clutch is used to start the car or other object to be driven and a solid or positive drive from the motor to the rear wheels provided.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section partly in side elevation of a clutch constructed in accordance with this invention, parts being broken out, Fig. 2 is a transverse section taken on the line 2—2 of Fig. 1, and Fig. 3 is a detail.

In the embodiment illustrated, a center or drive shaft 1 is shown, polygonal in cross section being here shown square with a reduced rounded extension 2 on its front end to form a journal designed to enter the ball race in the center of a fly wheel of an automobile, and which serves to give the support to the clutch at the front. This shaft 1 has a longitudinally extending slot 3 therein, through which extends a pin 4 projecting at its opposite ends above and below said shaft. This slot 3 allows the pin 4 to move back and forth without interference. The shaft 1 also has an aperture extending transversely therethrough at a point in the rear of and spaced longitudinally from the slot 3 and which is designed to receive a pin 5. This pin 5 is designed to secure in position on the shaft a collar 6 which extends radially from a sleeve 7 which encircles the shaft and through which the pin 5 projects. This collar 6 also has a flange 8 extending therefrom concentric with the shaft 1 and is designed to take the end thrust of the clutch transmitting it to a thrust ball race 9 arranged at the rear of collar 6.

The transmission case, not shown, is designed to be arranged behind the ball race 9, while the fly wheel of the automobile is designed to support the journal 2. A dog clutch 10 is adapted to be fitted on the fly wheel, counter-sunk seats 11 being provided in said clutch member to receive bolts for securing said member to the fly wheel.

A sleeve 12 encircles the front end of shaft 1, being broached to fit thereon, or splined or keyed to said shaft to permit it to slide thereon and yet prevent it turning relatively thereto. This sleeve 12 carries at its front end a coöperating dog clutch 13 for interlocking engagement with the clutch member 10 carried by the fly wheel as is shown clearly in Fig. 1 and which forms the positive connection between the driving shaft and the driven shaft. This sleeve 12 is also apertured for the passage of pin 4 so that when said pin is moved the sleeve will be reciprocated longitudinally on the shaft, the extent of movement being limited by the length of slot 3.

Another sleeve 14 closely encircles sleeve 12 and is slidably mounted on said sleeve on splines broached to fit those on the outside of sleeve 12. This sleeve 14 has a slot 15 similar to the slot 3 in shaft 1 through which the pin 4 projects. This sleeve is also threaded at the rear of said slot 15 as shown at 16, and on this threaded portion are mounted large nuts 17 in the form of rings, two of which are here shown operating together. A third nut 18, similar to nuts 17 has threaded engagement with the sleeve 14 and coöperates with a nut 19 L-shaped in cross section, the flange 20 of which is arranged concentric with shaft 1 and sleeve 14 and is designed to form a seat for a coiled clutch spring 21, the other end of which is mounted in the sleeve formed by the flange 8 of collar 6 as is shown clearly in Fig. 1.

The two nuts 17 are designed to maintain the adjustment of sleeve 14 relatively to sleeve 12, while those 18 and 19 are designed for increasing or reducing the tension of the clutch spring 21.

The sleeve 14 has a radially extending flange 14' at its front end, and to this flange is designed to be bolted a friction clutch, which may be of any desired construction, being preferably in the form of a leather-faced cone 14ᵃ.

The rear end 22 of the sleeve 14 is tapered so that the spring 21 will not interfere with the sleeve when the spring is depressed.

A collar 23 is mounted on the outside of sleeve 14 and is held in place by the pin 4 and supports a ball race 24 composed of three rings 25, 26 and 27 which are held in assembled position by a collar 28 which has threaded engagement with the collar 23 on the periphery thereof, and is provided at its other end with an inturned flange 29.

The pin 5 is similarly held in position by the thrust race 9 which prevents said pin from slipping transversely through the shaft.

A heavy coiled spring 30 encircles the rear end of shaft 1, engaging at its front end with the rear end of sleeve 12, and at its rear end the collar 6, and exerts its tension to retain the clutch members 10 and 13 tightly in operative engagement.

A pair of clutch levers 31 mounted on a shaft 32 are positioned for coöperation with the thrust ball race 24, and when depressed by the driver will operate to move the ball race 24 forward, carrying with it the collar 23 and the dog clutch member 13. When the teeth of the two dog clutches 10 and 13 are disengaged, the two adjusting ring nuts 17 are engaged by the collar 23 and are carried back with said collar, thereby releasing the cone clutch from the fly wheel. Obviously, when the clutch is let in the reverse action will occur, and said cone clutch will first take the drive and after the collar 23 leaves the nuts 17, the positive clutches 10 and 13 will come into engagement. The tension on the clutch proper is not necessarily as tight as the conventional form of clutch, and in fact need be only a trifle tighter than a slipping contact, since the positive clutches 10 and 13 perform all the hard work.

From the above description it will be obvious that the cone clutch carried by the flange 14' will be used to start the car and the driving thereof will be accomplished by the clutches 10 and 13 giving a solid drive from the motor to the rear wheels, and preventing all possibility of the slipping of the clutch.

The foregoing description and the drawings have reference to what may be considered the preferred or approved form of my invention. It is to be understood that I may make such changes in construction and arrangement and combination of parts, materials, dimensions, etc, as may prove expedient and fall within the scope of the claimed invention.

Having thus fully described my invention, what I claim as new and desire to secure by Letters Patent, is:—

1. In a clutch of the class described, the combination of a shaft having a longitudinally disposed slot extending therethrough, a pin mounted to reciprocate in said slot and projecting at its ends beyond said shaft, another pin extending transversely through said shaft at a point spaced from said first-mentioned pin, a thrust collar secured by said second-mentioned pin and having a flange concentric with said shaft to form a spring housing, a ball race at the rear of said collar to receive the thrust therefrom and to hold said pin in position, a sleeve keyed to slide on said shaft, a clutch member fixed to said sleeve, a fly wheel rotatably supporting said shaft and having friction and positive clutch members, the latter to coöperate with said sleeve carried clutch member and form a positive connection between said wheel and shaft, another sleeve slidable on said shaft engaging sleeve with a slot registering with the shaft slot through which and said first-mentioned sleeve said first-mentioned pin extends, a friction clutch member carried by the outer sleeve adapted to coöperate with the friction clutch member on the fly wheel, springs engaging said sleeves and thrust collar to hold the clutches engaged, and means for releasing first the positive clutch and then the friction clutch.

2. The combination with a driving member and a driven shaft, a positive clutch member carried by the driving member, the driven shaft having a longitudinal slot extending therethrough and an aperture extending in the same direction and spaced from the slot, pins mounted in said slot and aperture with their ends projecting beyond the shaft, one of said pins being fixed and the other slidable relatively to the shaft, a combined spring housing and thrust collar secured by said fixed pin, a sleeve mounted to slide on said shaft and having an aperture through which the sliding pin extends, a positive clutch member carried by said sleeve, another sleeve slidable on the first-mentioned sleeve and having registering slots to receive the sliding pin, a collar carried by said outer sleeve with a ball race holding said pin in operative position, nuts adjustably mounted on said outer sleeve, one having a flange to form a spring housing, a coiled spring mounted to engage said housings and to project the outer sleeve into operative position, a similar spring mounted on the shaft to project the first-mentioned sleeve, and means for moving said outer sleeve whereby first the positive clutch is released and then the friction clutch.

In testimony whereof I affix my signature in presence of two witnesses.

HERBERT C. NEVILLE.

Witnesses:
G. E. MOREHOUSE,
H. W. YOUNG.